J. KJEKSTAD.
ALTERNATING CURRENT ARC WELDING SYSTEM.
APPLICATION FILED MAY 27, 1919.
1,368,507.
Patented Feb. 15, 1921.
2 SHEETS—SHEET 1.
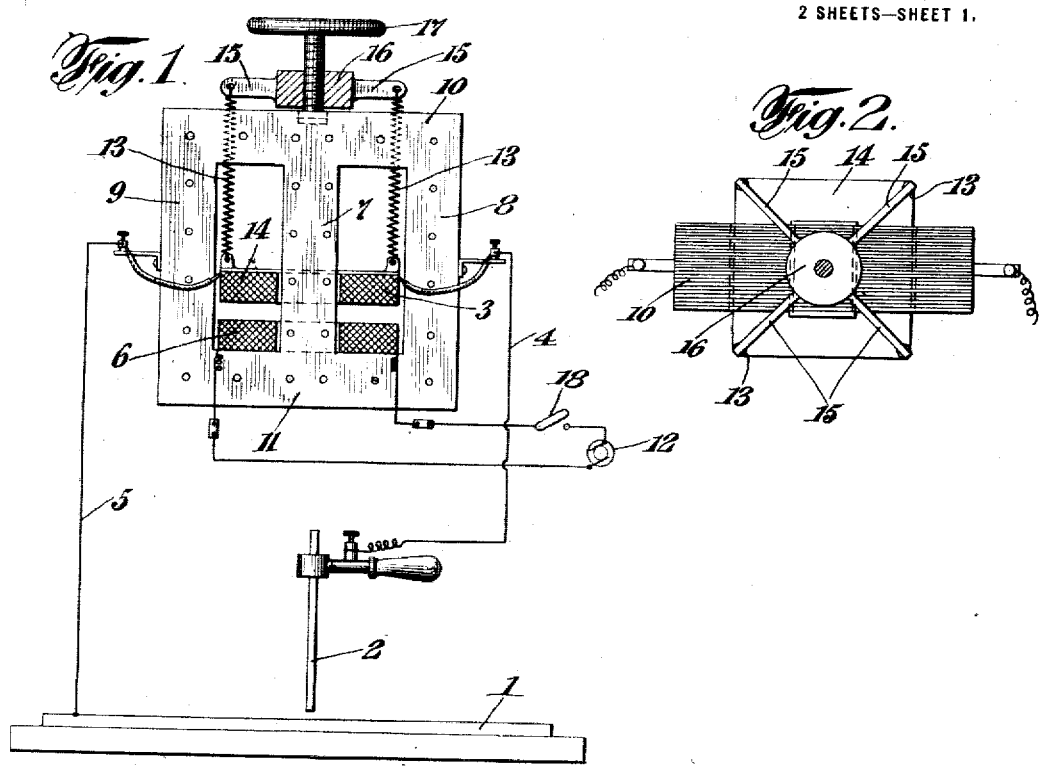
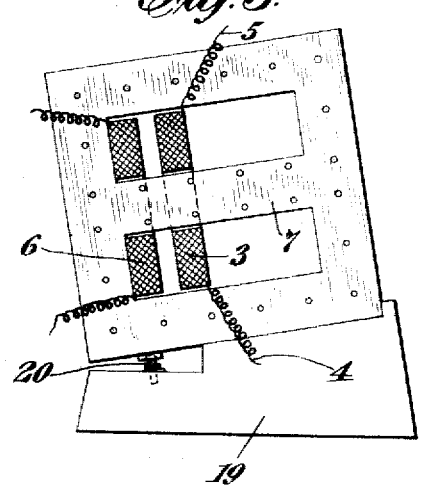
INVENTOR
Johannes Kjekstad
BY
Rosenbaum, Stockbridge & Borah
ATTORNEYS J. KJEKSTAD.
ALTERNATING CURRENT ARC WELDING SYSTEM.
APPLICATION FILED MAY 27, 1919.
1,368,507.
Patented Feb. 15, 1921.
2 SHEETS—SHEET 2.
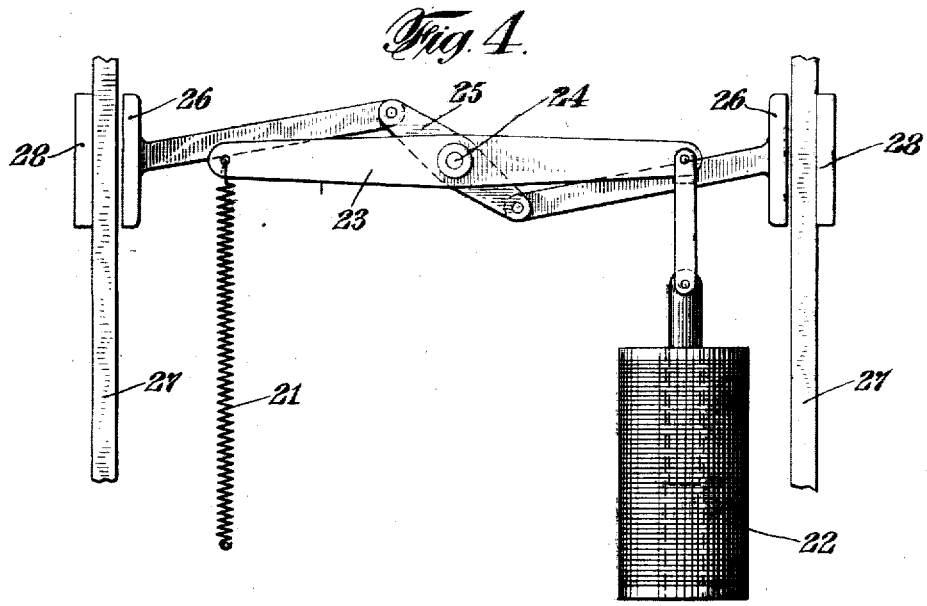
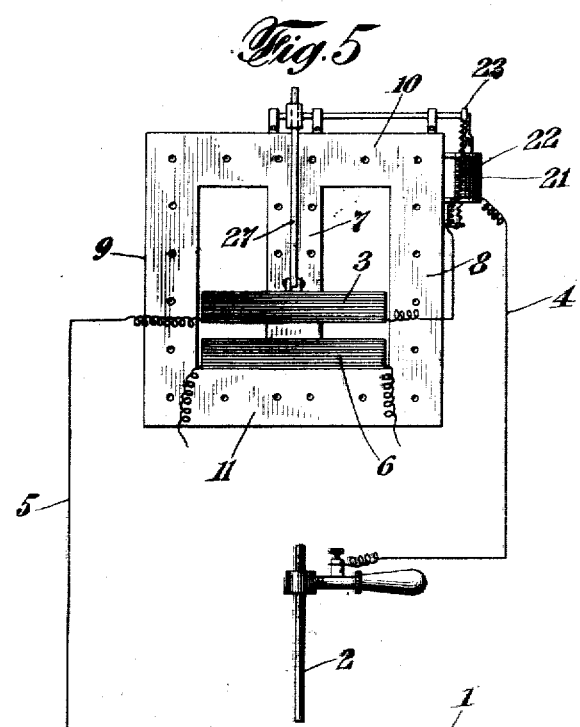
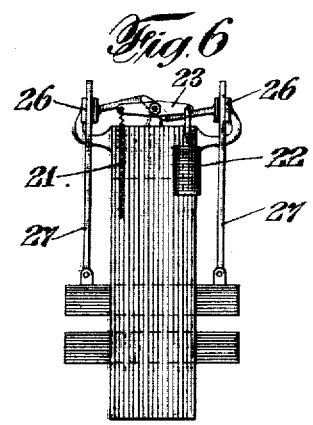
INVENTOR
Johannes Kjekstad
BY
Rosenbaum, Stockbridge & Boros
ATTORNEYS

UNITED STATES PATENT OFFICE.

JOHANNES KJEKSTAD, OF BROOKLYN, NEW YORK.

ALTERNATING-CURRENT ARC-WELDING SYSTEM.

1,368,507.  Specification of Letters Patent.  Patented Feb. 15, 1921.

Application filed May 27, 1919. Serial No. 300,046.

*To all whom it may concern:*

Be it known that I, JOHANNES KJEKSTAD, a subject of the King of Norway, residing at the city of New York, in the borough of Brooklyn and State of New York, have invented certain new and useful Improvements in Alternating-Current Arc-Welding Systems, of which the following is a full, clear, and exact description.

My invention has particular application to electric arc welding methods and systems utilizing alternating current, and my invention is particularly applicable to means for compensating automatically for variations in resistance in the welding circuit so as to provide a substantially constant welding current, within the range necessary for welding, the term resistance including both ohmic resistance and reactance. In practice the resistance of the welding circuit varies from several causes, such as the use of different lengths of connecting cables or other variations in the character of the circuits. It is essential that the temperature and hence the wattage at the arc be substantially uniform, and to effect this result it is necessary not only that the length and consequently the resistance of the arc be kept practically constant, but that the desired amperage be maintained substantially constant. It is also desirable that sufficient energy be at all times available to prevent a rupture of the arc under welding conditions.

For this purpose the potential which is impressed inductively upon the welding circuit may be regulated in accordance with the resistance of the secondary circuit, thereby maintaining the induced current substantially constant. Suitable automatic means may be provided for automatically regulating the magnetic leakage in the induction device in accordance with the counter magnetic flux. To this end the coils may be made relatively movable and the counter magnetic flux be utilized to regulate the inductive relation of the coils, and in the well known constant current transformer.

It is also advantageous, with a given primary potential, to regulate the secondary potential to any predetermined amount and thus secure a welding current of any desired value for a given resistance in the welding circuit. This may be accomplished by making a part of the induction device movable to vary the magnetic leakage, and biased to a position of either maximum or minimum leakage, and by providing means for varying the bias tendency. In the event, for instance, that one of the coils is made movable on the core toward and away from its complementary coil, the device may be so arranged that the movable coil will tend under gravity to approach the fixed coil, and adjustable means, such as a spring, the tension of which is adjustable, may be arranged in opposition to gravity. In this way, the maximum current is available in starting the arc, and as soon as the coil or other movable part assumes its position of balance the current drops to the predetermined value. Since the coil is in balance during the welding operation, a full supply of energy is instantly available to prevent rupture of the arc.

An object of my invention is to avoid movement of the movable part of such a constant current transformer to full load position when the circuit is broken, as when, for instance, the arc is ruptured. To accomplish this I employ a brake controlled by the current in the welding circuit and arranged in control of the movable part. If one of the coils is made relatively movable, for example, it will, unless restrained, move to its biased full load position when the welding circuit is broken, and when the circuit is again closed there will be a rush of current until the movable coil assumes the position for inducing the current for which the transformer is adjusted, which is substantially the position which it occupied when the circuit was interrupted. To obviate that I preferably employ a spring actuated brake which is magnetically released and operates to seize the coil and hold it when the circuit is interrupted, and to release it again when the circuit is restored.

My invention has other objects and advantages, and includes other features as will appear more fully from the following description of two embodiments of the invention.

Figure 1 is a diagram of a system for carrying out my invention, with the transformer in sectional elevation;

Fig. 2 is a plan of the transformer;

Fig. 3 is a detail in sectional elevation of a modified form of transformer which may be used in my system;

Fig. 4 is an enlarged elevation of the braking mechanism;

Fig. 5 is a side elevation of a transformer with the braking mechanism, showing a diagram of the welding circuit; and Fig. 6 is an end elevation of the transformer.

For the purpose of illustration I have selected a transformer in which the primary coil is fixed and the secondary coil is movable and is normally held by gravity in its maximum inductive position. The welding circuit includes the work 1, the coöperating electrode 2, the secondary coil 3, and the cables 4 and 5. The fixed primary coil 6 is disposed underneath the movable secondary coil 3, and the common magnetic circuit consists of a central core 7 and the side members 8 and 9 joined at the top and bottom by bridges 10 and 11. Current is supplied to the primary coil by a suitable alternator 12.

The secondary coil floats upon the central core, and it is evident that the repulsion of the secondary coil, due to the reaction between the magnetic fields of the two coils, will be opposed by gravity, and that a position of balance will be assumed by the secondary coil. which with a given resistance, determines the current which will be induced in the welding circuit.

In order to predetermine this current I provide means for altering this position of balance for a given condition, which is done by varying the gravity bias of the primary coil. It is manifest that the greater the gravity tendency of the coil, the less movement and consequently the less magnetic leakage there will be of the coil for any repulsive force, and vice versa. In the form shown in the Figs. 1 and 2, the primary coil is suspended by four springs 13 which are attached at their lower ends to the corners of a plate 14 on the top of the coil, and at their upper ends to arms 15 of a suspension member 16 which is raised or lowered by a hand wheel and screw 17. The springs 13 are relatively weak and are unable to support the coil unaided, and consequently the raising and lowering of the suspension member merely serve to alter the tension of the springs.

The position of balance is assumed when the repulsive force plus the tension of the springs is equal to the force of gravity. To start the welding operation the primary circuit is closed through the switch 18 and secondary circuit is closed by bringing the electrode 2 into contact with the work and the arc is then struck in the usual way. The secondary coil 3 will imediately move away from the primary coil until the opposing forces balance, and this position is determined by the tension of the springs 13 which is regulated according to the resistance of the welding circuit. For instance to obtain a welding current of a given value the tension of the springs will be less when long connecting cables are used than when the cables are relatively shorter. Thereafter the position of balance of the movable coil will vary no more than is sufficient to compensate for variations in the length of the arc. If the arc should become unduly long, the drop in the induced current causes a diminution in the repulsive force, and the force of gravity is temporarily preponderate and the coils assume a position of greater inductive relation and supply the necessary energy to prevent a rupture of the arc. Similarly if the arc becomes too short the current value rises and the repulsive force becomes temporarily preponderate, and the coils assume a position of less inductive relation. The current is thereby kept substantially constant.

The force of gravity may be modified in other ways than by springs. For instance, as shown in Fig. 3, the transformer frame may be supported on a base 19 on its side in an inclined position, and the force of gravity may be modified by varying the degree of inclination by adjusting a supporting screw 20, one or more of which may be used. Manifestly the bias tendency of the movable part may be obtained in other ways than by reliance upon gravity, but the means shown will serve to illustrate the principle of the invention.

The braking mechanism shown in Figs. 4, 5 and 6 is under the joint control of a spring 21 and a solenoid 22 which act in opposition to each other, the spring acting to apply the brake. The spring is attached to one end of a rock arm 23 and tends to depress it, and the core of the solenoid is attached to the other end of the rock arm and serves to depress that end as the core is attracted in to the solenoid. The rock arm 23 is mounted on one end of a rock shaft 24, on the other end of which is a double toggle lever 25, which operates oppositely acting brake shoes 26. Flat strips 27 which carry the movable coil 3 on their lower ends are guided between the brake shoes 26 and stationary bearing blocks 28.

When the rock arm 23 is depressed by the spring it causes the toggle lever 25 to push the brake shoes 26 against the strips 27 and hold the movable coil stationary, and when the solenoid 22 attracts its core, the rock arm is rocked in the opposite direction and the strips 27 are released. The solenoid 22 is in series with the movable coil as shown in Fig. 5. As long, therefore, as the welding circuit is intact, the solenoid 22 is energized by a substantially constant current, and the movable coil is free to oscillate, and the interruption of the circuit permits the spring 21 to operate and immediately apply the brakes. As soon as the circuit is again completed the solenoid 22 is energized and releases the brake, thus rendering the coil free to follow the variations in the welding arc. There are no sudden plunges of the moving part as the circuit is broken and made again. As the secondary circuit is open the full voltage is available for starting the arc just as though the secondary coil had been permitted to fall to the full load position.

It is obvious that various modifications may be made in the constructions shown in the drawings and above particularly described within the principle and scope of my invention.

I claim:

1. An electric arc welding system comprising, in combination with a welding circuit including the two electrodes, a source of alternating current for the welding circuit, a transformer including a movable part operative by its movement to vary the magnetic leakage and responsive to variations in resistance in the welding circuit to maintain the current therein substantially constant, a spring actuated brake operative to lock the movable part, and electro-magnetic means fed by the current and potential of the secondary circuit and operative to release the brake.

2. An electric arc welding system comprising, in combination with the two electrodes, a source of alternating current, a primary coil connected to said source, a secondary coil inductively related to the primary coil and having its terminals connected to the respective electrodes, one of the coils being movable to vary the inductive relation and having a bias to the maximum inductive position, a spring actuated brake operative to lock the movable coil, and electro-magnetic means fed by the current and potential of the movable coil and operative to release the brake.

3. In combination with a constant current transformer having a biased part movable to vary the magnetic leakage, a magnetically controlled brake operative to lock the biased part against movement when the induced current is zero.

In witness whereof I subscribe my signature.

JOHANNES KJEKSTAD.